Jan. 5, 1932. G. WALTHER 1,839,453

METAL WHEEL

Original Filed April 14, 1924

INVENTOR,
George Walther,
BY Howard P. Smith,
His ATTORNEY.

Patented Jan. 5, 1932

1,839,453

UNITED STATES PATENT OFFICE

GEORGE WALTHER, OF DAYTON, OHIO, ASSIGNOR TO THE DAYTON STEEL FOUNDRY COMPANY, OF DAYTON, OHIO, A CORPORATION OF OHIO

METAL WHEEL

Original application filed April 14, 1924, Serial No. 706,237. Divided and this application filed April 7, 1928. Serial No. 268,212.

This application is a division of my application Serial No. 706,237, filed April 14, 1924, and relates more particularly to a metal wheel having an extended hub portion to the outer periphery of which a single tire support is secured at its inner edge. This promotes economy of manufacture, easy demountability of the tire support and a firm connection between the latter and the hub extension.

Other important and incidental objects will be brought out in the following specification and particularly set forth in the subjoined claims.

Figure 1:
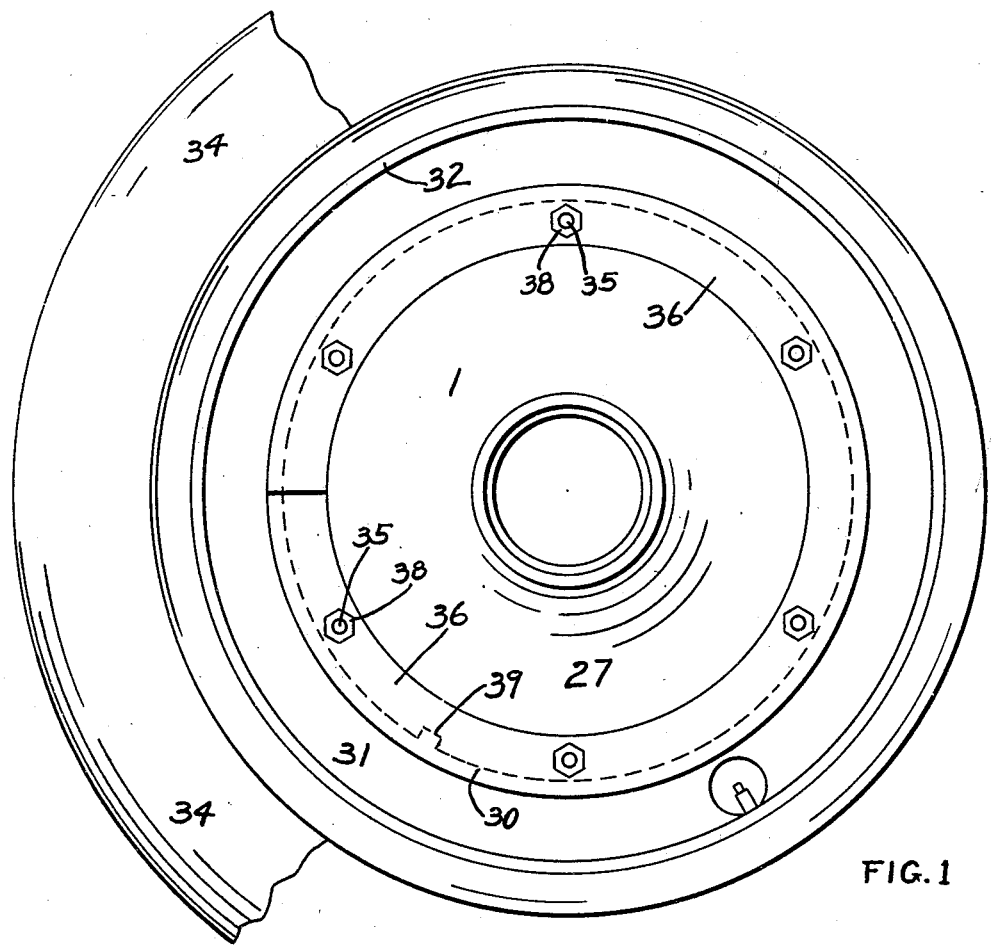
Figure 2:
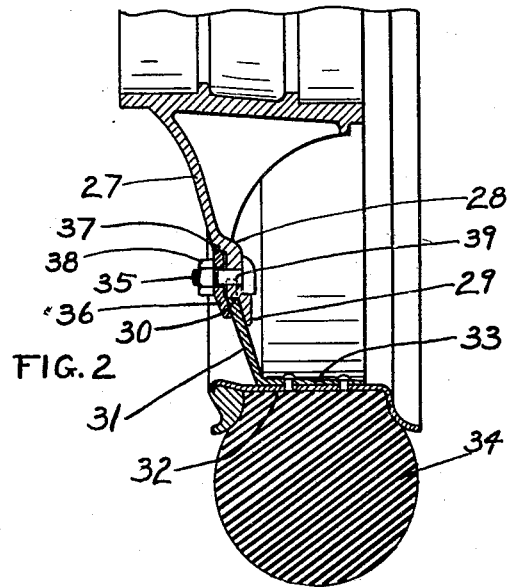

In the accompanying drawings, Figure 1 is a side elevational view of my metal wheel constructed for single tire use, and Figure 2 is a sectional view taken radially through said wheel.

Referring to the accompanying drawings for a detailed description of my invention, the numeral 1 designates a metal wheel having an extended hub portion such as that provided by the web 27. This web is formed at its outer part with a thick offset portion 28. The latter terminates in a radial flange portion 29 whose outer side is beveled to provide, with the peripheral edge 30 of the web, a double seat for a tire support such as that provided by a tapering rim flange 31 and a tire rim 32 secured to a lateral portion 33 of said flange. This rim flange 31 is preferably rolled and formed from a suitable strip of metal, preferably steel. Upon the tire rim portion 32 of said support there is mounted a tire 34, preferably of the pneumatic type.

Formed in the offset portion 28 of the web 27, and spaced at uniform distances apart around it, are bolt holes which receive bolts 35. The heads of these bolts are substantially semicircular to fit in recesses in the inner portion of the offset part of the web, and on the outer ends of these bolts a split ring 36 is loosely fitted to enter a shoulder notch 37 formed in the offset portion 28 of the web. The base of this notch is beveled to permit the inner edge of the split ring 26, which is also beveled, to be pressed tightly against it by nuts 38 on the outer ends of the bolts.

The outer part of the split ring 36 is inclined or tapered inwardly to engage the inner part of the rolled rim flange 31 when the nuts 38 are screwed inwardly on the bolts 35, to press said rim flange firmly against the beveled seat 29 which the offset portion 28 of the web 27 provides for it. The inner edge of the rolled rim flange 31, which is the widest part of its taper, will also seat firmly against the web along its outer peripheral edge 30. This bolt connection between the web and the tire support insures a certain yield or springiness at points which are somewhat distant from the hub, to save the metal from crystallization when the wheel is subjected to road shocks.

Formed on the inner edge of the rolled rim flange 31 is a driving lug 39 which enters a recess formed in the outer peripheral edge of the web 27, for the purpose of driving the tire support.

Having described my invention, I claim:

1. A metal wheel having a hub and a curved hub flange formed with an offset straight radial part providing at its circumferential edge a narrow lateral seat, an offset extremity with its axially outer face beveled, projecting radially outward from the straight part of the hub flange, a tire support, an inclined straight flange on said tire support fitting against the lateral seat, the hub flange having a beveled part merging into its straight part, and a split clamping ring having a beveled part adapted to bear against the beveled part of the hub flange, and a beveled part extending axially inward to bear against the inclined flange on the tire support to hold it against the beveled offset extremity of the hub flange.

2. A metal wheel having a hub and a curved hub flange formed with an offset straight radial part providing at its circumferential edge a narrow lateral seat, an offset extremity with its outer face beveled, projecting radially outward from the straight part of the hub flange, leaving a recess between it and said straight part of the hub flange, a tire support, an inclined straight flange on the tire support fitting against said lateral seat, a split clamping ring having a radially inclined outer part adapted to bear against the tire support flange, bolts passing through said clamping ring and the offset straight part of the hub flange, and heads on said bolts fitting in the recess formed between the straight part of the hub flange and its beveled outer extremity.

In witness whereof I have hereunto set my hand this 29th day of March, 1928.

GEORGE WALTHER.